United States Patent
Elteto

(10) Patent No.: US 7,222,240 B2
(45) Date of Patent: May 22, 2007

(54) TOKEN FOR STORING INSTALLATION SOFTWARE AND DRIVERS

(75) Inventor: Laszlo Elteto, Irvine, CA (US)

(73) Assignee: Safenet, Inc., Belcamp, MD (US)

(*) Notice: Subject to any disclaimer, the term of this patent is extended or adjusted under 35 U.S.C. 154(b) by 497 days.

(21) Appl. No.: 10/289,042

(22) Filed: Nov. 6, 2002

(65) Prior Publication Data

US 2003/0110389 A1    Jun. 12, 2003

Related U.S. Application Data

(63) Continuation-in-part of application No. 09/764,769, filed on Jan. 16, 2001, now Pat. No. 7,111,324, which is a continuation-in-part of application No. 09/449,159, filed on Nov. 24, 1999, which is a continuation-in-part of application No. 09/281,017, filed on Mar. 30, 1999, now Pat. No. 6,671,808, application No. 10/289,042, which is a continuation-in-part of application No. 09/899,472, filed on Jul. 3, 2001, which is a continuation-in-part of application No. 09/449,159, filed on Nov. 24, 1999, and a continuation-in-part of application No. 09/281,017, filed on Mar. 30, 1999, now Pat. No. 6,671,808, said application No. 09/899,472 is a continuation-in-part of application No. 09/764,769, filed on Jan. 16, 2001, now Pat. No. 7,111,324, and a continuation-in-part of application No. 09/594,456, filed on Jun. 15, 2000.

(60) Provisional application No. 60/334,690, filed on Nov. 6, 2001, provisional application No. 60/116,006, filed on Jan. 15, 1999.

(51) Int. Cl.
*H04K 1/00* (2006.01)
*G06F 7/04* (2006.01)
*H04L 9/00* (2006.01)

(52) U.S. Cl. .................. 713/185; 713/1; 713/2; 713/159; 713/161; 713/165; 713/171; 713/172; 713/173; 710/8; 710/10; 710/13; 710/104; 726/2; 726/9; 726/20; 709/220; 709/223; 709/225

(58) Field of Classification Search ............ 713/159, 713/161, 165, 171–173, 182, 200–201, 185, 713/1, 2, 100; 709/223–229; 705/55–56, 705/50, 66; 710/8, 10, 13, 104, 301, 302, 710/350; 726/9, 20
See application file for complete search history.

(56) References Cited

U.S. PATENT DOCUMENTS 4,734,855 A * 3/1988 Banatre et al. ............ 711/164

(Continued)

OTHER PUBLICATIONS

Business Wire, Rainbow Technologies Adds USB Support for PC and Macintosh Software Developers to Sentinel Line Nov. 17, 1998, p. 1.*

(Continued)

*Primary Examiner*—Taghi T. Arami
*Assistant Examiner*—Jenise E. Jackson
(74) *Attorney, Agent, or Firm*—Venable LLP; James R. Burdett; Steven J. Schwarz

(57) ABSTRACT

A "dual" personal key/token is disclosed. The "dual" personal key is useful for installing drivers and other command interfaces which allow the personal key to be coupled to and used with a host computer. In a first embodiment, the personal key operates as a USB hub, and reports two devices, a storage device and a personal key, to the host computer. In a second embodiment presents a single device, and different portions of the personal key are activated as required.

4 Claims, 5 Drawing Sheets

U.S. PATENT DOCUMENTS

| | | | | |
|---|---|---|---|---|
| 5,784,581 | A * | 7/1998 | Hannah | 710/110 |
| 5,884,086 | A * | 3/1999 | Amoni et al. | 713/300 |
| 6,131,125 | A * | 10/2000 | Rostoker et al. | 709/250 |
| 6,205,501 | B1 * | 3/2001 | Brief et al. | 710/100 |
| 6,522,550 | B1 * | 2/2003 | Nishio et al. | 361/752 |
| 6,584,519 | B1 * | 6/2003 | Russell | 710/62 |
| 6,587,053 | B1 * | 7/2003 | Lee | 340/825.72 |
| 6,704,824 | B1 * | 3/2004 | Goodman | 710/300 |

OTHER PUBLICATIONS

PR Newswire, Alladin Knowldedge Systems and Ashely Laurent, Inc. Enter Into Joint Marketing Agreement for Innovative USB Key Container and VPCom Remote Access Solutions, Jan. 15, 1999, p. 1.*

Business Wire, Aladdin Launches MacHasp USB for Comdex; The First Software Protection Token for iMac and USB-Equippe Macs, Nov. 12, 1998, p. 1.*

Business Wire, Aladdin Knowledge Systems, Feb. 11, 1998, p. 1.*

Scot, Simple USB-Based Ethernet Networking, Windows Magazine 1999, n 1003, p. 92.*

Business Wire, Aladdin Knowledge Systems Launches USBHasp and Hardlock USB, Mar. 2, 1998.*

Jakarta, Aladdin the Magic to Protect your Data from Prying Eyes, Mar. 2, 1998, p. 1.*

RSA's SecurID 3000 Card Promotes PKI Environment, Nov. 1, 1999, vol. 13, iss. 20.*

Scot, Simple USB-Based Ethernet Networking, Windows Magazine 1999, n 1003, p. 92.*

Sandler, Electronic Business, May 1999, 25, 5, 72(1).*

Wong, Computer Shopper, Aug. 1995, v15, n8, p. 574(4).*

* cited by examiner

TOKEN FOR STORING INSTALLATION SOFTWARE AND DRIVERS

This application claims benefit of U.S. Provisional Patent Application No. 60/334,690, entitled "TOKEN FOR STORING INSTALLATION SOFTWARE AND DRIVERS," by Laszlo Elteto, filed Nov. 6, 2001.

This application is also a continuation-in-part of the following and commonly assigned patent application(s).

U.S. patent application Ser. No. 09/764,769, entitled "USB HUB KEYPAD," by Laszlo Elteto, Shawn D. Abbott, James Khalaf, Reed H. Tibbetta, Mehdi Sotoodeh and Calvin W. Long, filed Jan. 16, 2001 now U.S. Pat. No. 7,111,324, which application is a continuation-in-part of U.S. patent application Ser. No. 09/449,159, filed Nov. 24, 1999, by Shawn D. Abbott, Bahram Afghani, Mehdi Sotoodeh, Norman L. Denton III, and Calvin W. Long, and entitled "USB-COMPLIANT PERSONAL KEY WITH INTEGRAL INPUT AND OUTPUT DEVICES," which is a continuation-in-part of U.S. patent application Ser. No. 09/281,017, filed Mar. 30, 1999 now U.S. Pat. No. 6,671,808 by Shawn D. Abbott, Bahram Afghani, Allan D. Anderson, Patrick N. Godding, Maarten G. Punt, and Mehdi Sotoodeh, and entitled "USB-COMPLIANT PERSONAL KEY," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt, and Mehdi Sotoodeh, and entitled "USB-COMPLIANT PERSONAL KEY"; and U.S. patent application Ser. No. 09/899,472, entitled "SECURE IR COMMUNICATION BETWEEN A KEYPAD AND TOKEN", by Laszlo Elteto, Shawn D. Abbott, James Khalaf, Reed H. Tibbetts, Mehdi Sotoodeh and Calvin W. Long, filed Jul. 3, 2001, which is a continuation in part of the following patent applications:

U.S. patent application Ser. No. 09/449,159, filed Nov. 24, 1999, by Shawn D. Abbott, Bahram Afghani, Mehdi Sotoodeh, Norman L. Denton III, and Calvin W. Long, and entitled "USB-COMPLIANT PERSONAL KEY WITH INTEGRAL INPUT AND OUTPUT DEVICES";

U.S. patent application Ser. No. 09/281,017, filed Mar. 30, 1999 now U.S. Pat. No. 6,671,808 by Shawn D. Abbott, Bahram Afghani, Allan D. Anderson, Patrick N. Godding, Marten G. Punt, and Mehdi Sotoodeh, and entitled "USB-COMPLIANT PERSONAL KEY," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt, and Mehdi Sotoodeh, and entitled "USB-COMPLIANT PERSONAL KEY";

U.S. patent application Ser. No. 09/594,456, filed Jun. 15, 2000, by Shawn D. Abbott, Allan D. Anderson, Patrick N. Godding, Maarten G. Punt, and Mehdi Sotoodeh, and entitled "USB-COMPLIANT PERSONAL KEY USING A SMARTCARD PROCESSOR AND A SMARTCARD READER EMULATOR"; and U.S patent application Ser. No. 09/764,769, filed Jan. 16, 2001 now U.S. Pat. No. 7,111,324, by Laszlo Elteto, Shawn D. Abbott, Jim Khalaf, Reed H. Tibbetts, Mehdi Sotoodeh, and Calvin W. Long, and entitled "USB HUB KEYPAD".

BACKGROUND OF THE INVENTION

1. Field of the Invention

The present invention relates to computer peripherals, and in particular to a personal key storing installation software.

2. Description of the Related Art

In the last decade, the use of personal computers in both the home and in the office have become widespread. These computers provide a high level of functionality to many people at a moderate price, substantially surpassing the performance of the large mainframe computers of only a few decades ago. The trend is further evidenced by the increasing popularity of laptop and notebook computers, which provide high-performance computing power on a mobile basis.

The widespread availability of personal computers has had a profound impact on interpersonal communications as well. Only a decade ago, telephones or fax machines offered virtually the only media for rapid business communications. Today, a growing number of businesses and individuals communicate via electronic mail (e-mail). Personal computers have also been instrumental in the emergence of the Internet and its growing use as a medium of commerce.

While certainly beneficial, the growing use of computers in personal communications, commerce, and business has also given rise to a number of unique challenges.

First, the growing use of computers has resulted in extensive unauthorized use and copying of computer software. costing software developers substantial revenue. Although unauthorized copying or use of software is a violation of the law, the widespread availability of pirated software and enforcement difficulties have limited the effectiveness of this means of preventing software piracy.

Software developers and computer designers alike have sought technical solutions to attack the problem of software piracy. One solution uses an external device known as a hardware key, or "dongle" coupled to an input/output (I/O) port of the host computer.

While the use of such hardware keys is an effective way to reduce software piracy, to date, their use has been substantially limited to high value software products. Hardware keys have not been widely applied to popular software packages, in part, because the hardware keys are too expensive, and in part, because there is a reluctance on the part of the application program user to bother with a hardware key whenever use of the protected program is desired. Also, in many cases, the hardware keys are designed for use with only one application. Hence, where the use of multiple applications on the same computer is desired, multiple hardware keys must be operated at the same time.

While it reflects a tremendous advance over telephones and facsimile machines, e-mail also has its problems. One of these problems involves security. Telephone lines are relatively secure and a legally sanctioned way to engage in the private transmission of information, however, e-mails are generally sent over the Internet with no security whatsoever. Persons transmitting electronic messages must be assured that their messages are not opened or disclosed to unauthorized persons. Further, the addressee of the electronic message should be certain of the identity of the sender and that the message was not tampered with at some point during transmission.

Although the packet-switching nature of Internet communications helps to minimize the risk of intercepted communications, it would not be difficult for a determined interloper to obtain access to an unprotected e-mail message.

Many methods have been developed to secure the integrity of electronic messages during transmission. Simple encryption is the most common method of securing data. Both secret key encryption such as DES (Data Encryption Standard) and public key encryption methods that use both a public and a private key are implemented. Public and private key encryption methods allow users to send Internet and e-mail messages without concern that the message will be read by unauthorized persons or that its contents will be tampered with. However, key cryptographic methods do not protect the receiver of the message, because they do not allow the recipient to authenticate the validity of the public key or to validate the identity of the sender of the electronic message.

The use of digital certificates presents one solution to this problem. A digital certificate is a signed document attesting to the identity and public key of the person signing the message. Digital certificates allow the recipient to validate the authenticity of a public key. However, the typical user may use e-mail to communicate with hundreds of persons, and may use any one of several computers to do so. Hence, a means for managing a number of digital certificates across several computer platforms is needed.

Internet commerce raises other challenges. Users seeking to purchase goods or services using the Internet must be assured that their credit card numbers and the like are safe from compromise. At the same time, vendors must be assured that services and goods are delivered only to those who have paid for them. In many cases, these goals are accomplished with the use of passwords. However, as Internet commerce becomes more commonplace, customers are finding themselves in a position where they must either decide to use a small number of passwords for all transactions, or face the daunting task of remembering multiple passwords. Using a small number of passwords for all transactions inherently compromises security, since the disclosure of any of the passwords may lead to a disclosure of the others. Even the use of a large number of passwords can lead to compromised security. Because customers commonly forget their password, many Internet vendors provide an option whereby the user can be reminded of their password by providing other personal information such as their birthplace, mother's maiden name, and/or social security number. This feature, while often necessary to promote Internet commerce, severely compromises the password by relying on "secret" information that is in fact, publicly available.

Even in cases where the user is willing and able to keep track of a large number of passwords, the password security technique is often compromised by the fact that the user is inclined to select a password that is relatively easy to remember. It is indeed rare that a user selects a truly random password. What is needed is a means for generating and managing random passwords that can be stored and recalled for use on a wide variety of computer platforms.

Internet communications have also seen the increased use of "cookies." Cookies comprise data and programs that keep track of a user's patterns and preferences that can be downloaded from the Internet server for storage on the user's computer. Typically, cookies contain a range of addresses. When the browser encounters those addresses again, the cookies associated with the addresses are provided to the Internet server. For example, if a user's password were stored as a cookie, the use of the cookie would allow the user to request services or goods without requiring that the user enter the password again when accessing that service for the second and subsequent time.

However beneficial, cookies can also have their dark side. Many users object to storage of cookies on their computer's hard drive. In response to these concerns, Internet browser software allows the user to select an option so that they are notified before cookies are stored or used. The trouble with this solution is that this usually results in an excessive number of messages prompting the user to accept cookies. A better solution than this all-or-nothing approach would be to allow the storage and/or use of cookies, but to isolate and control that storage and use to comply with user-specified criteria.

Tokens having a Universal Serial Bus (USB) interface can help solve the foregoing problems, but one difficulty in such tokens is that system drivers, application program interfaces (APIs) and other software elements must typically be installed in the host computer terminal before the token can interface with the computer terminal. This can severely limit the token's usefulness by substantially reducing the number of computers that the token can interface with.

One method of solving this problem is to make the installation software available on the Internet where it can be downloaded and installed on remote computers. This, however, requires that the computer terminal have access to the Internet. Further, since the installation programs can be large, a cable or digital subscriber line (DSL) link is required, or the downloading of the program can take an excessive length of time. Another method of solving this problem is to simply carry the installation software in the form provided (typically a CD-ROM) and load it on the computer terminal before using the token. The problem with this is that CD-ROMs are not convenient to carry. This can substantially limit the token's usefulness. What is needed is a system that allows token installation software to be quickly and easily loaded on remote computer terminals so that the token can be utilized.

SUMMARY OF THE INVENTION

To address the requirements described above, the present invention discloses a method, apparatus, article of manufacture, and a memory structure for installing drivers supporting a personal key attachable to a host computer via a USB-compliant interface. In one embodiment, the apparatus is a personal key, communicatively coupleable to a host computer having a memory. The personal key comprises a USB-compliant interface, a processor, communicatively coupled to the USB-compliant interface, a first memory, communicatively coupled to the processor, and an auxiliary memory, communicatively coupled to the processor, for storing a driver in the memory of the host computer when the personal key is coupled to the host computer via the USB-compliant interface. In another embodiment, the first or auxiliary memory stores a command interface processing set includes instructions for monitoring the command interface file, for interpreting data written to the command interface file as a USB command and for interpreting data read from the command interface file as a response to the USB command. The method comprises the steps of attaching the personal key to a host computer via the USB-compliant interface, reporting an auxiliary memory having a driver stored therein to the host computer, installing the driver in the host computer; and accepting a command from the installed driver to activate the personal key.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
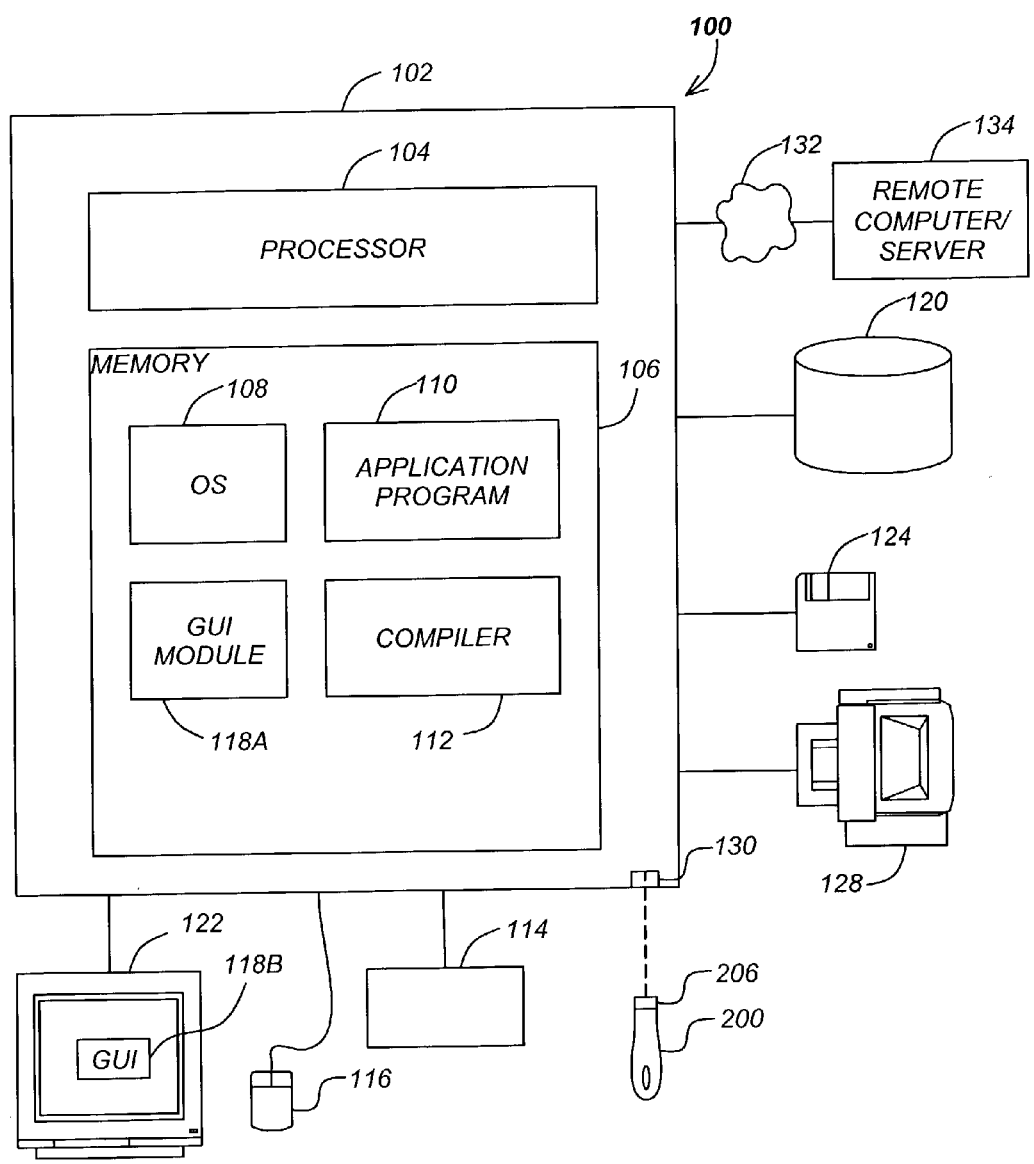
FIG. 1 is a diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that are generated using the compiler 112. The computer 102 also comprises an input/output (I/O) port 130 for a personal token 200 (hereinafter alternatively referred to also as a personal key 200). In one embodiment, the I/O port 130 is a USB-compliant port implementing a USB-compliant interface.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

The computer 102 may be communicatively coupled to a remote computer or server 134 via communication medium 132 such as a dial-up network, a wide area network (WAN), local area network (LAN), virtual private network (VPN) or the Internet. Program instructions for computer operation, including additional or alternative application programs can be loaded from the remote computer/server 134. In one embodiment, the computer 102 implements an Internet browser, allowing the user to access the world wide web (WWW) and other internet resources.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Figure 2:
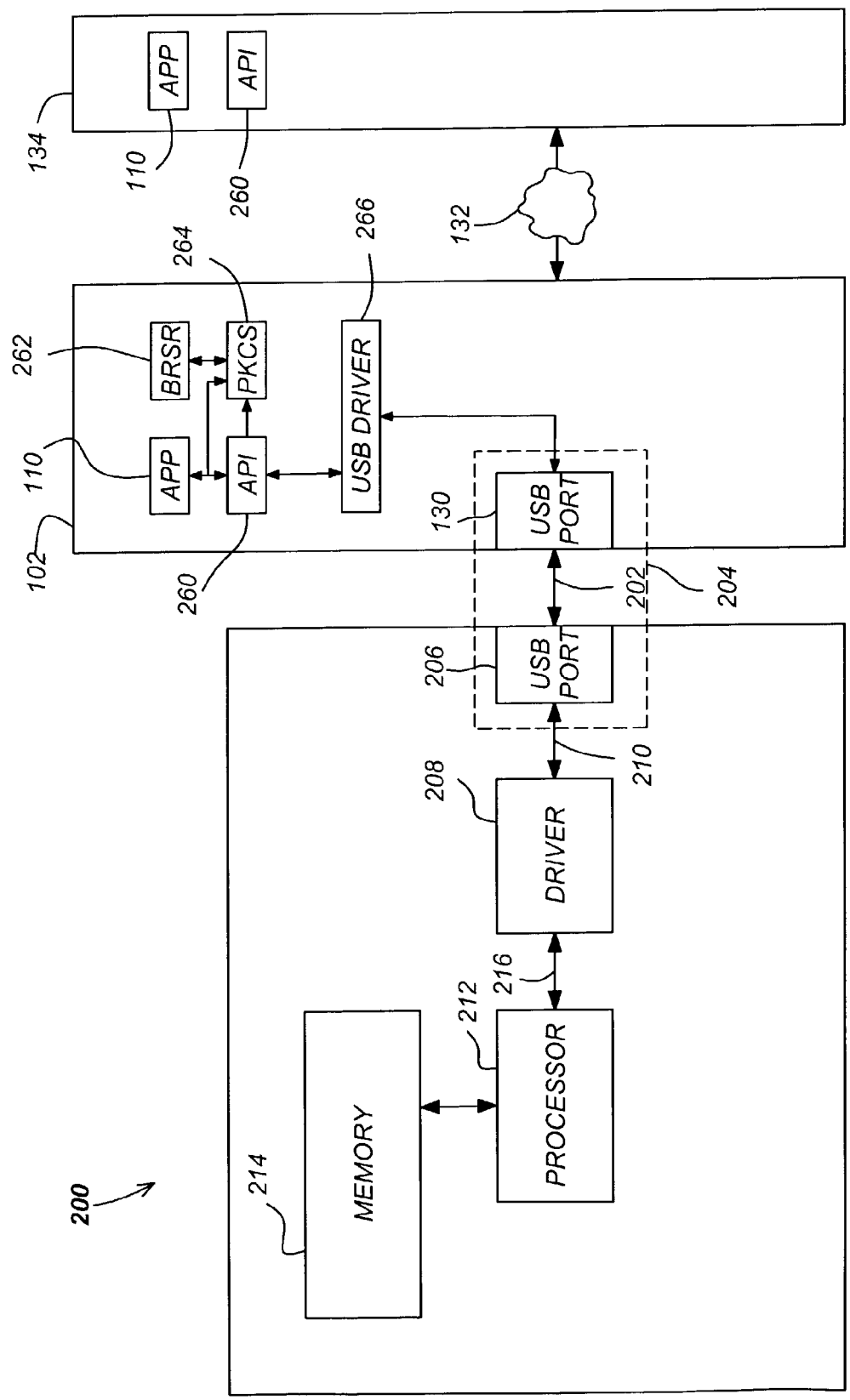
FIG. 2 is a block diagram illustrating selected modules of one embodiment of the present invention.

FIG. 2 is a block diagram illustrating selected modules of the present invention. The personal key 200 communicates with and obtains power from the host computer through a USB-compliant communication path 202 in the USB-compliant interface 204 which includes the input/output port 130 of the host computer 102 and a matching input/output (I/O) port 206 on the personal key 200. Signals received at the personal key I/O port 206 are passed to and from the processor 212 by a driver/buffer 208 via communication paths 210 and 216. The processor 212 is communicatively coupled to a memory 214, which may store data and instructions to implement the above-described features of the invention. In one embodiment, the memory 214 is a non-volatile random-access memory that can retain factory-supplied data as well as customer-supplied application related data. The processor 212 may also include some internal memory for performing some of these functions.

The personal key has an interface including a USB driver module 266 communicatively coupled to an application program interface (API) 260 having a plurality of API library routines. The API 260 provides an interface with the application 110 to issue commands and accept results from the personal key 200. In one embodiment, a browser 262, such as the browser available from NETSCAPE, Inc. operates with the API 260 and the public key cryptographic standard (PKCS) module 264 to implement a token-based user authentication system.

As described above, one of the difficulties in using the personal token 200 is that the user first has to install drivers and other software on the host computer 100 (e.g. Cryptoki and API libraries). This makes it difficult to use the token as a truly portable device (since most host computers will not have the driver software installed). This problem is due to the fact that USB communication protocols require a special driver which must be installed before the personal key 200 is plugged in and used. USB protocols are described in the document "Universal Serial Bus Specification," Revision 2.0, published Apr. 27, 2000, which is hereby incorporated by reference herein.

Figure 3:
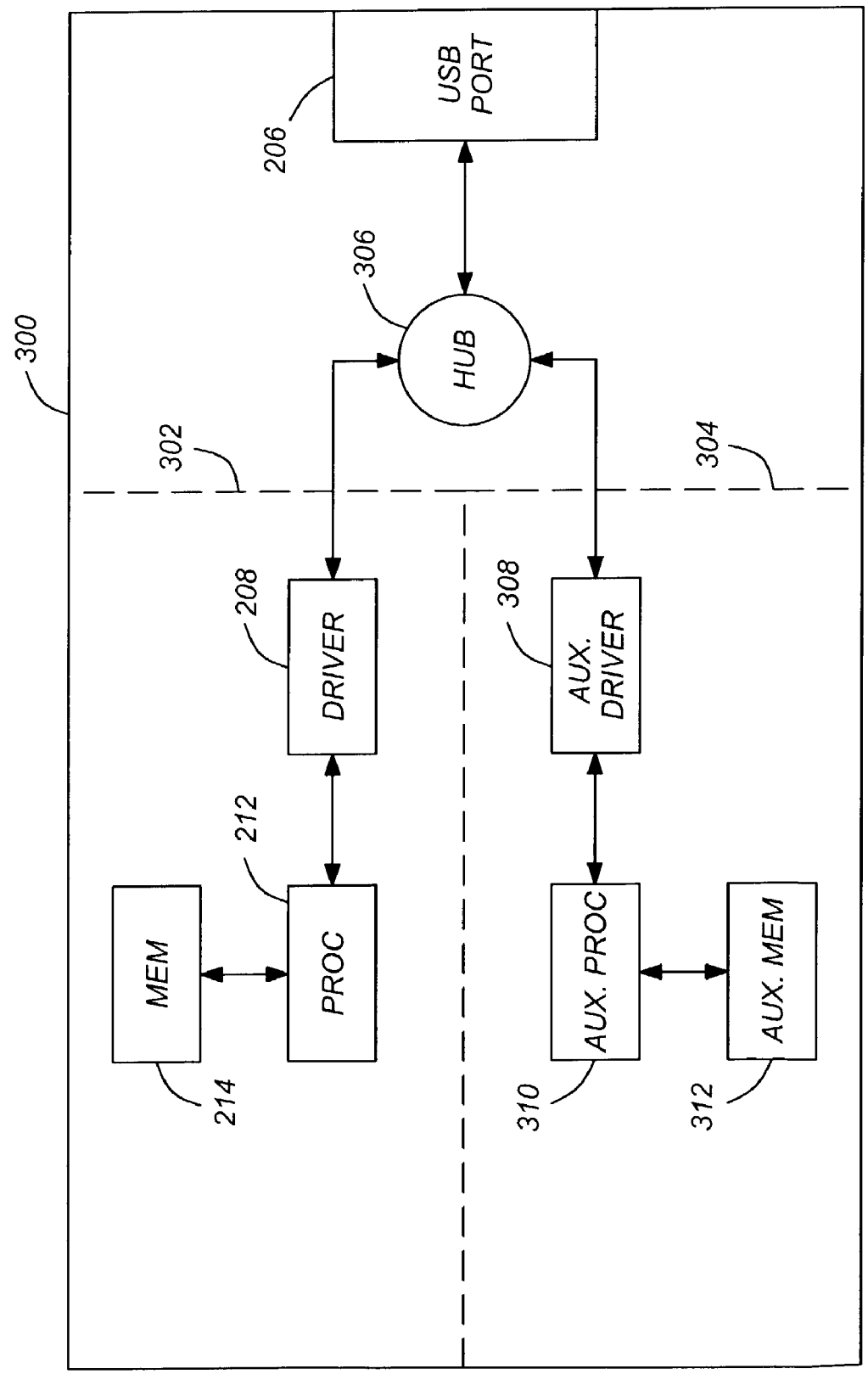
FIG. 3 is a diagram presenting a "dual" personal key.

The embodiment presented in FIG. 3 presents a solution to this problem. FIG. 3 illustrates a "dual" personal key 300. The "dual" personal key 300 comprises a first portion 302 which operates much the same way as the personal key 200 illustrated in FIG. 2 (e.g. like an IKEY 1000, 1200, or 2000), and a second portion 304 which operates as a simple USB storage device that can be automatically recognized as and used by the OS 108 (such as WINDOWS 98/ME/2000).

A hub 302 directs communications to the first portion 302 and/or the second portion 304 as required. The second portion 304 comprises an auxiliary memory 312, which may be coupled directly to the hub 306 or communicatively coupled to the hub 306 via an auxiliary processor 310 and an auxiliary driver 308. The memory 312 may include random access memory (RAM) as well as read only memory (ROM) that can be to store data and software/firmware. These memory elements can be incorporated into a single device or separate devices as required.

In one implementation, the personal key 300 acts like a USB hub, and it reports two USB devices to the host computer 100, a storage device (the second portion 304) and an ordinary personal key 200 (the first portion 302). In one embodiment, only the second portion 304 is presented when the personal key 300 is powered up (and before any required software drivers and other modules are installed in the host computer 100). The first portion 302 is subsequently activated (e.g. by writing to a specific file stored in the memory 312). For example, when the user plugs the personal key 300 into the host computer 100, the personal key 300 acts like removable storage (e.g. a floppy, CD, or a ZIP drive) and the user can simply install the necessary drivers in the host computer 100 as they are read from the auxiliary memory 312. After installation, the drivers look for USB storage devices, check for a specific file (which may identify or designate the device as a personal key 300) and activates the other portion 302.

Figure 4:
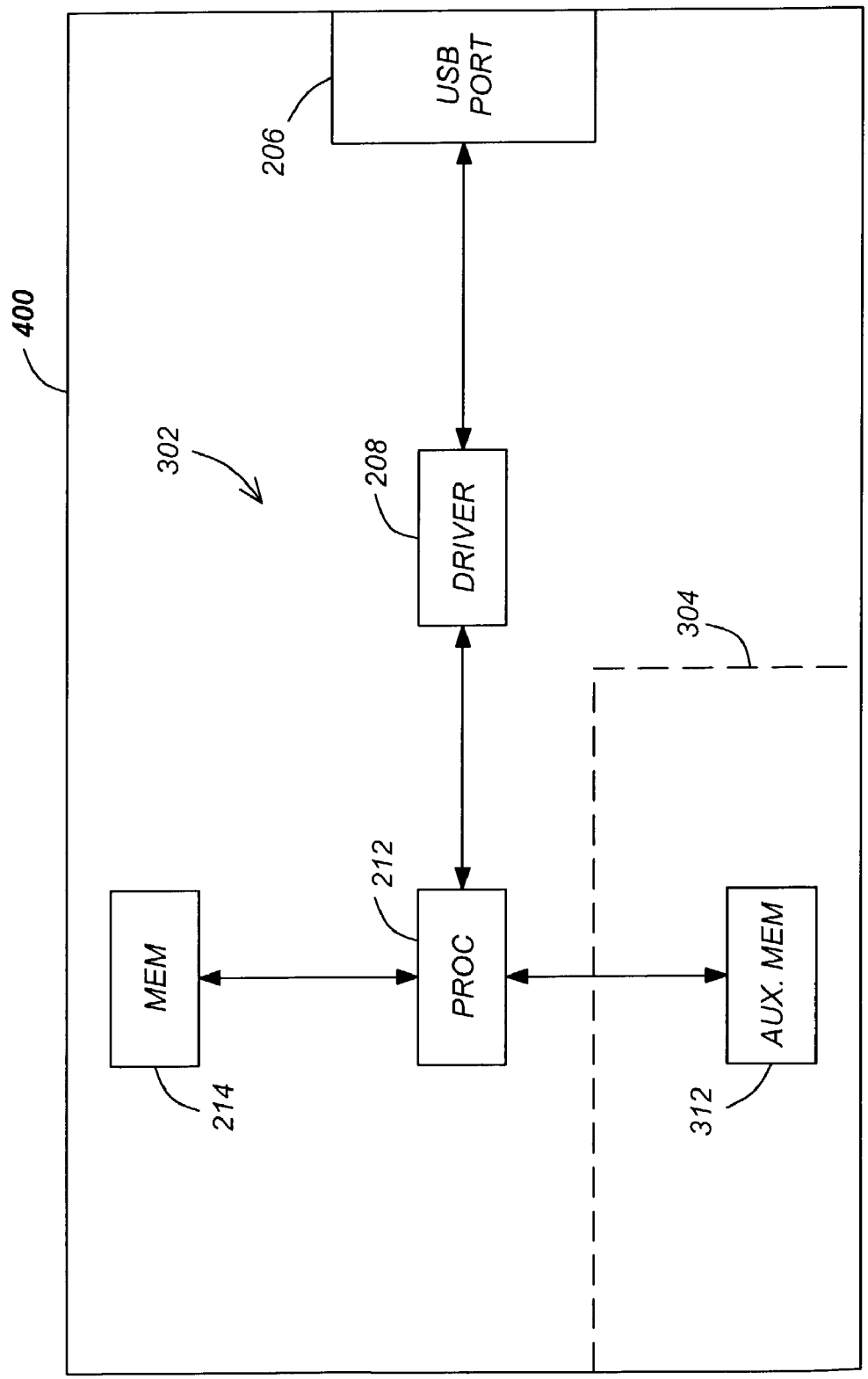
FIG. 4 is a diagram showing an alternative embodiment of the personal key.

FIG. 4 is a diagram showing another implementation of the present invention. In this embodiment, the personal key 300 still comprises the first portion 302 and the second portion, but acts like one device only. When powered up, the personal key 400 still presents itself as a USB storage device, but when a signal is sent (e.g. such as writing to a file), it would provide a "storage removal" and "device removal" signal to the OS 108 and immediately after, the first portion 302 of the personal key 400 would become activated. The driver software would be installed as described with respect to FIG. 3.

In yet another embodiment of the present invention, the personal key (300 or 400) does not require a specialized USB interface at all. Instead, the personal key (300 or 400) acts like a USB storage device (from the OS 108 perspective).

To assure that cryptographic functionality is provided (the personal key (300 or 400) is a security token, not insecure and "dumb" storage), the implementation of communications between the USB interface 206 and the personal key (300 or 400) can be changed to a different protocol using read and write operations to a file. Software (preferably firmware) in the personal key (300 or 400) monitors a designated file (a command interface file). If data is written to the command interface file, the firmware interprets the data written as a current USB command. The USB command associated with the interpreted data is performed, and a response to the command is generated. When the firmware reads this response from the command interface file, it is interpreted as the USB response to the USB command provided earlier.

The foregoing allows the personal key (300 or 400) to act as a storage device as well (for any other file than the command interface file). This means that software (libraries, browser plug-ins, complete applications, and the like) will be available when the personal key (300 or 400) is coupled to the host computer.

The foregoing also obviates the need for a driver. This is important, because although other embodiments of the invention provide the necessary driver in the personal key (300 or 400) storage, under WINDOWS 2000, normal users would have difficulty installing the driver (for security reasons, driver installation usually requires administrator privileges).

The foregoing also preserves all the functionality of the personal key (300 or 400), and merely offers a different (perhaps, alternative) path to communicate with the personal key (300 or 400). The personal key (300 or 400) API library(s), particularly those APIs supporting personal key communications can be updated to include the necessary functionality.

Although the foregoing has disclosed the use of a auxiliary memories and processors, the foregoing invention can be implemented with suitably configured single processors/memories as well. Further, although the foregoing has been described with respect to a USB-compliant device, the invention can be implemented in other devices, such as smart cards, as well.

Figure 5:
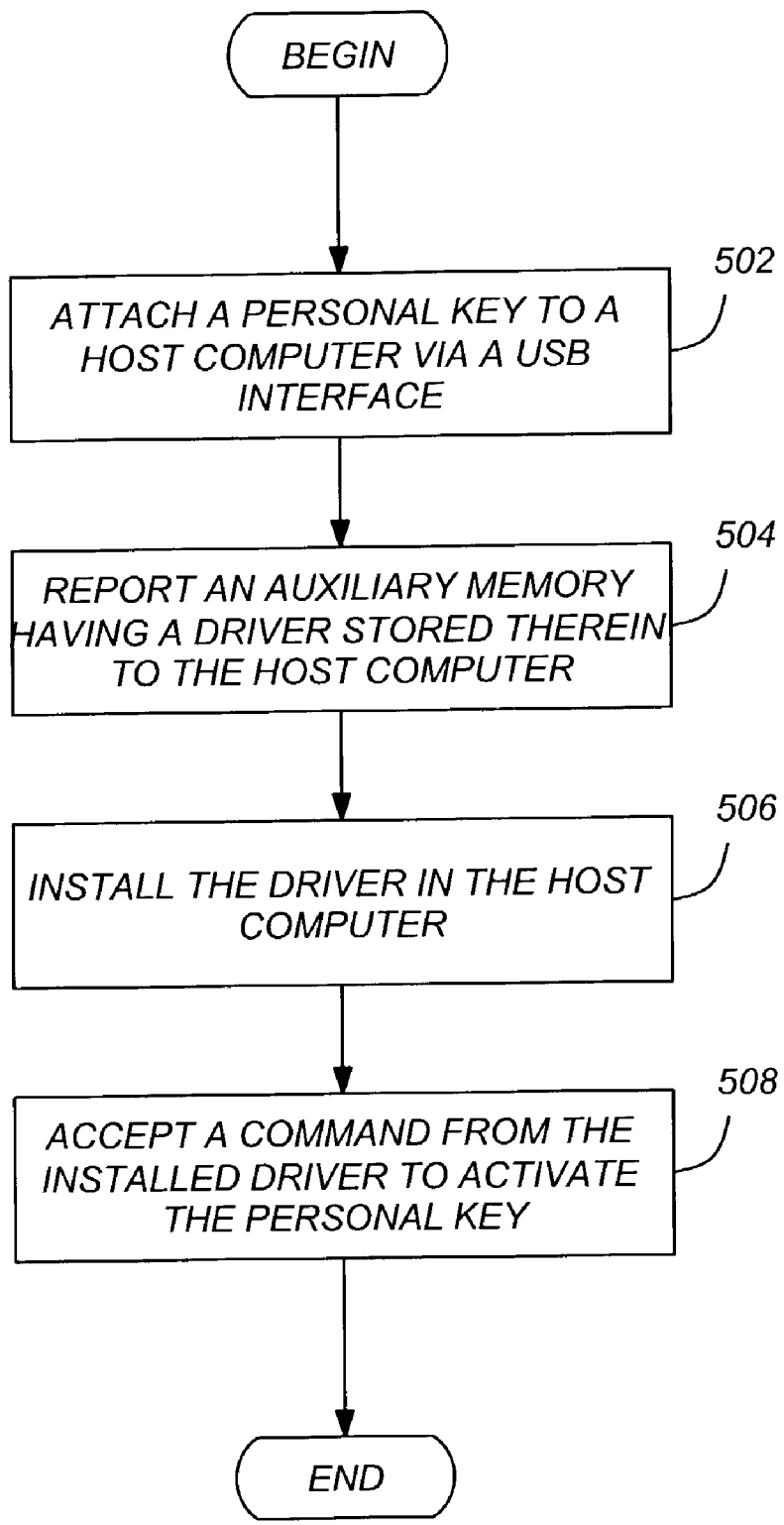
FIG. 5 is a flow chart presenting illustrative method steps that can be used to practice the present invention.

FIG. 5 is a flow chart presenting illustrative operations that can be used to practice one embodiment of the invention, which includes installing drivers supporting a personal key attachable to a host computer via a USB-compliant interface. A personal key (300 and 400) is attached to the host computer 100, as shown in block 502. An auxiliary memory 312 having a driver stored therein is reported to the host computer 100, as shown in block 504. Then, the driver is installed in the host computer 100, as shown in block 506. Finally, a command is accepted from the installed driver to activate the personal key, as shown in block 508.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A personal key, communicatively coupleable to a host computer having a memory, comprising:
   a USB-compliant interface;
   a USB hub, communicatively coupled to the USB-compliant interface;
   a processor, communicatively coupled to the USB hub;
   a first memory, communicatively coupled to the processor; and an auxiliary memory, communicatively coupled to the hub for storing a driver in the memory of the host computer when the personal key is coupled to the host computer via the USB-compliant interface, wherein the USB hub reports a first device having the auxiliary memory and a second device having the processor and first memory, wherein the USB hub reports only the first device upon power up.

2. The personal key of claim 1, wherein the USB hub reports the first device as a storage device.

3. A personal key, communicatively coupleable to a host computer having a memory, comprising:
   a USB-compliant interface;
   a USB hub, communicatively coupled to the USB-compliant interface;
   a processor, communicatively coupled to the USB hub;
   a first memory, communicatively coupled to the processor; and an auxiliary memory, communicatively coupled to the hub, for storing a driver in the memory of the host computer when the personal key is coupled to the host computer via the USB-compliant interface, wherein the USB hub reports a first device having the auxiliary memory and a second device having the processor and first memory, wherein the USB hub reports the second device only after the driver has been installed in the host computer.

4. A personal key, communicatively coupleable to a host computer having a memory, comprising:

a USB-compliant interface;

a USB hub, communicatively coupled to the USB-compliant interface;

a processor, communicatively coupled to the USB hub;

a first memory, communicatively coupled to the processor; and an auxiliary memory, communicatively coupled to the hub, for storing a driver in the memory of the host computer when the personal key is coupled to the host computer via the USB-compliant interface, wherein the USB hub reports a first device having the auxiliary memory and a second device having the processor and first memory, wherein the USB hub reports the first device as a storage device.

* * * * *